US012564140B2

(12) United States Patent
Yuan

(10) Patent No.: US 12,564,140 B2
(45) Date of Patent: Mar. 3, 2026

(54) DRIVING ASSEMBLY AND GARDEN TOOL

(71) Applicant: Greenworks (Jiangsu) Co., Ltd.,
Changzhou (CN)

(72) Inventor: Chenglong Yuan, Changzhou (CN)

(73) Assignee: Greenworks (Jiangsu) Co., Ltd.,
Changzhou (CN)

( * ) Notice: Subject to any disclaimer, the term of this
patent is extended or adjusted under 35
U.S.C. 154(b) by 200 days.

(21) Appl. No.: 18/473,303

(22) Filed: Sep. 25, 2023

(65) Prior Publication Data

US 2024/0107952 A1 Apr. 4, 2024

(30) Foreign Application Priority Data

Sep. 30, 2022 (CN) .......................... 202222600389.6

(51) Int. Cl.
| | |
|---|---|
| *A01G 3/06* | (2006.01) |
| *A01D 34/00* | (2006.01) |
| *A01D 34/416* | (2006.01) |
| *A01D 101/00* | (2006.01) |
| *A01G 3/053* | (2006.01) |

(52) U.S. Cl.
CPC ............. *A01G 3/062* (2013.01); *A01G 3/053*
(2013.01); *A01D 34/006* (2013.01); *A01D
34/416* (2013.01); *A01D 2101/00* (2013.01)

(58) Field of Classification Search
CPC ................................ A01G 3/062; A01G 3/053
See application file for complete search history.

(56) References Cited

U.S. PATENT DOCUMENTS

| | | | | |
|---|---|---|---|---|
| 4,037,323 | A * | 7/1977 | Seibold .................. | A01G 3/067 |
| | | | | 30/206 |
| 8,256,120 | B2 * | 9/2012 | Million ................ | A01D 34/416 |
| | | | | 30/123.3 |
| 9,854,738 | B2 * | 1/2018 | Miller .................... | A01D 34/90 |
| 11,432,479 | B2 * | 9/2022 | Rosenthal ............. | A01D 69/06 |
| 2001/0027610 | A1 * | 10/2001 | Wheeler ............. | A01D 34/736 |
| | | | | 30/276 |
| 2006/0123635 | A1 * | 6/2006 | Hurley ................. | A01D 34/902 |
| | | | | 30/276 |
| 2009/0090094 | A1 * | 4/2009 | Million ................ | A01D 34/416 |
| | | | | 56/13.4 |
| 2014/0208598 | A1 * | 7/2014 | Morita .................. | A01G 3/088 |
| | | | | 30/276 |
| 2016/0143219 | A1 * | 5/2016 | Yuan ...................... | B25F 5/008 |
| | | | | 30/276 |

FOREIGN PATENT DOCUMENTS

| | | |
|---|---|---|
| CN | 103448036 B | 1/2017 |
| EP | 3723468 B1 | 12/2021 |

* cited by examiner

*Primary Examiner* — Sean M Michalski

(57) ABSTRACT

The disclosure provides a driving assembly and a garden
tool. The driving assembly includes a connecting base and a
driving device. The driving device includes a driving body,
a mounting part and an output shaft. The output shaft
includes an input section and an output section. The input
section is housed in the driving body and extends outward
from the driving body to form the output section. The
mounting part is arranged on a side of the driving body close
to the output section, and a receiving hole is opened on the
connecting base. A side of the driving body away from the
output section passes through the receiving hole and con-
nects a bottom of the connecting base with the mounting
part.

13 Claims, 10 Drawing Sheets

2

200

14

13

321

32

1

2

4

5

1

2

2

3

41

41

DRIVING ASSEMBLY AND GARDEN TOOL

CROSS REFERENCE TO RELATED APPLICATION

The present application claims the priority of the following Chinese patent applications: serial No. 202222600389.6, filed Sep. 30, 2022; the disclosure of which is hereby incorporated by reference herein in its entirety for all purposes.

TECHNICAL FIELD

The disclosure belongs to a field of a driving assembly and a garden tool, and in particular to a driving assembly used on a string trimmer.

BACKGROUND

In a traditional string trimmer, the motor in the driving assembly is usually housed in a connecting base. The connecting base is provided with a hole for the output shaft to pass through. The output shaft passes through the hole from the top of the connecting base and is connected with the air extraction device at the bottom of the connecting base so that the output shaft can drive the air extraction device to rotate to reduce the temperature of the motor. However, such an assembly method results in the connecting base between the motor and the ventilation device, which enables the distance between the motor and the air extraction device to be larger and weakens the heat dissipation effect of the air extraction device on the motor.

In view of this, it is indeed necessary to improve the drive assemblies to solve the above problems.

SUMMARY

The disclosure provides a driving assembly and a string trimmer to solve problems of a large distance between a motor and an air extraction device and poor heat dissipation effect in a conventional driving assembly.

The disclosure provides a driving assembly, which includes a connecting base and a driving device. The driving device includes a driving body, a mounting part and an output shaft. The output shaft includes an input section and an output section. The output shaft includes an input section and an output section, the input section is housed in the driving body and extends outward from the driving body to form the output section, the mounting part is arranged on a side of the driving body close to the output section, a receiving hole is arranged on the connecting base, and a side of the driving body away from the output section passes through the receiving hole and connects a bottom of the connecting base with the mounting part.

In an embodiment of the disclosure, the connecting base includes a connecting part, the receiving hole is arranged at a center position of the connecting part, and the mounting part is fixedly connected with the connecting part.

In an embodiment of the disclosure, the driving assembly includes a locking component, the connecting part is provided with a first through hole, the mounting part is correspondingly provided with a mounting hole, and the locking component passes through the first through hole and the mounting hole to connect the driving device and the connecting base.

In an embodiment of the disclosure, the mounting part includes a mounting protrusion, a bottom of the connecting part is concave inward to form a clamping groove corresponding to the mounting protrusion, and at least part of the mounting protrusion is housed in the clamping groove.

In an embodiment of the disclosure, the driving assembly includes an air extraction device connected with the output section, and when the driving body drives the output shaft, the air extraction device rotates synchronously with the output shaft.

In an embodiment of the disclosure, the driving device includes a bearing arranged between the mounting part and the output shaft, a side of the air extraction device close to the driving body is provided with an abutting end extending along a direction toward the driving body, and the abutting end is in contact with the bearing.

In an embodiment of the disclosure, the air extraction device includes a fan blade, and a distance between the fan blade and the mounting part in an extension direction of the output shaft is 2 mm.

In an embodiment of the disclosure, the output shaft is provided with an anti-slip surface, the air extraction device includes a transmission hole coupled with the output shaft, a transmission surface is provided in the transmission hole, the output shaft is housed in the transmission hole and the anti-slip surface is in fitted with the transmission surface to enable the output shaft and the air extraction device to rotate synchronously.

In an embodiment of the disclosure, an end of the output section away from the driving body is provided with a first fixing end, the driving assembly further includes a cutting device, the cutting device is provided with a second fixing end and a shaft hole, the output shaft passes through the shaft hole and connects the first fixing end with the second fixing end to limit the air extraction device between the driving device and the cutting device.

The disclosure further provides a garden tool, which includes a battery assembly, a connecting assembly and a driving assembly. the connecting assembly connects the battery assembly and the driving assembly, the battery assembly is configured to supply power to the driving assembly, the driving assembly includes a connecting base and a driving device, the driving device includes a driving body, a mounting part and an output shaft, the output shaft includes an input section and an output section, the input section is housed in the driving body and extends outward from the driving body to form the output section, the mounting part is arranged on a side of the driving body close to the output section, a receiving hole is arranged on the connecting base, and a side of the driving body away from the output section passes through the receiving hole and connects a bottom of the connecting base with the mounting part.

In an embodiment of the disclosure, the connecting base includes a connecting part, the receiving hole is arranged at a center position of the connecting part, and the mounting part is fixedly connected with the connecting part.

In an embodiment of the disclosure, the driving assembly includes an air extraction device connected with the output section, and when the driving body drives the output shaft, the air extraction device rotates synchronously with the output shaft.

In an embodiment of the disclosure, the driving device includes a bearing arranged between the mounting part and the output shaft, a side of the air extraction device close to the driving body is provided with an abutting end extending along a direction toward the driving body, and the abutting end is in contact with the bearing.

In an embodiment of the disclosure, the garden tool is a string trimmer or a hedge trimmer.

The beneficial effects of the disclosure are: in the driving assembly of the disclosure, the receiving hole matching the driving body is arranged on the connecting base, the side of the driving body away from the output section passes through the receiving hole, and the driving body is housed in the receiving hole, so that there is no connecting block between an air extraction device and the driving body, which reduces a distance between the air extraction device and the driving body, improves a heat dissipation effect of the air extraction device on the driving body, and an overall power and performance of the driving assembly.

PART NUMBER DESCRIPTION

String trimmer—100, drive assembly—200, connecting assembly—300, battery assembly—400, fixing assembly—500;

housing—1, connecting cavity—11, protruding block—111, second fixing hole—12, second positioning hole—13, fastening part—14, fastening groove—15, housing cavity—16;

connecting base—2, receiving hole—21, connecting part—22, air outlet hole—221, wire groove—222, clamping groove—223, first through hole—23, second through hole—24, accommodating part—25, through hole—251, accommodating cavity—252, third through hole—26, blocking plate—27, fourth through hole—271;

driving device—3, driving body—31, connecting wire—32, connecting terminal—321, mounting part—33, mounting hole—331, mounting protrusion—332, bearing—34, output shaft—35, anti-slip surface—351, first fixing end—352, input section—353, output section—354;

air extraction device—4, fan blade—41, blade piece—411, clamping hole—412, toothed part—413, supporting plate—414, bottom plate—415, transmission component—42, gear part—421, abutting end—422, transmission hole—423, transmission surface—424;

cutting device—5, shaft hole—51, control part—6, connecting rod—7, first positioning hole—71, first fixing hole—72, opening—73, passage—74.

DETAILED DESCRIPTION

In order to enable the purpose, technical solutions and advantages of the disclosure to be clearer, the disclosure will be described in detail below with reference to drawings and specific embodiments.

Figure 1:
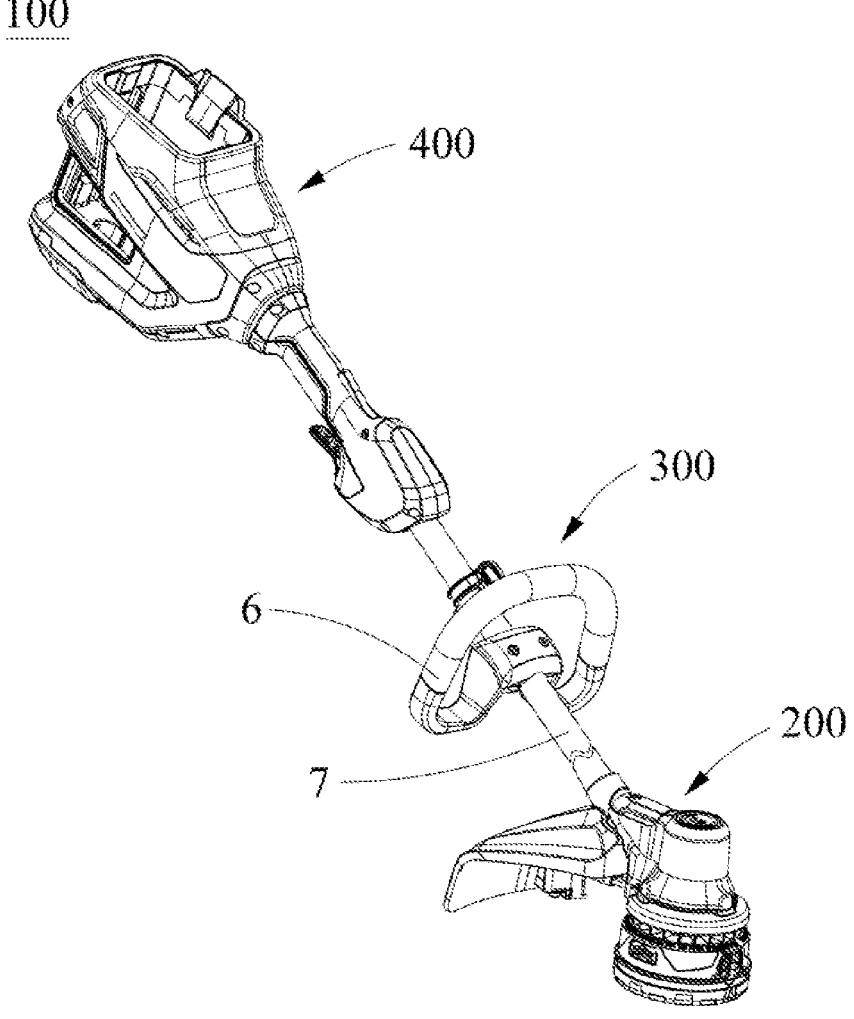
FIG. 1 is a schematic perspective view of a string trimmer according to an embodiment of the disclosure.
Figure 2:
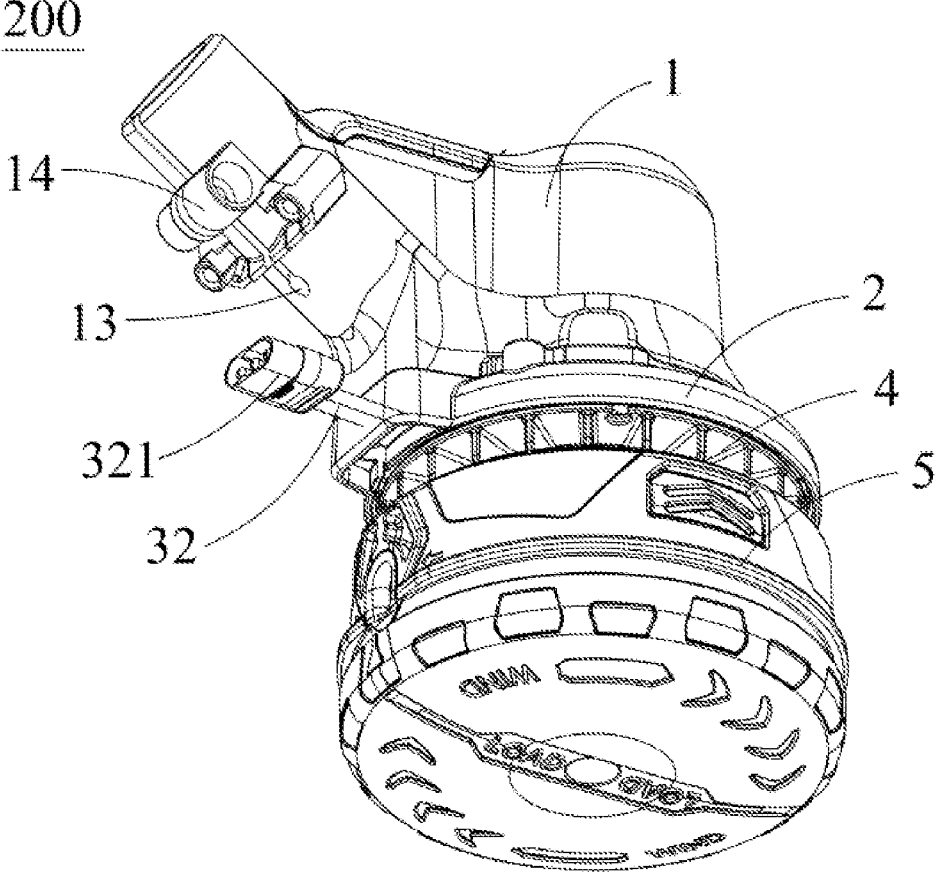
FIG. 2 is a schematic perspective view of a driving assembly in FIG. 1.
Figure 3:
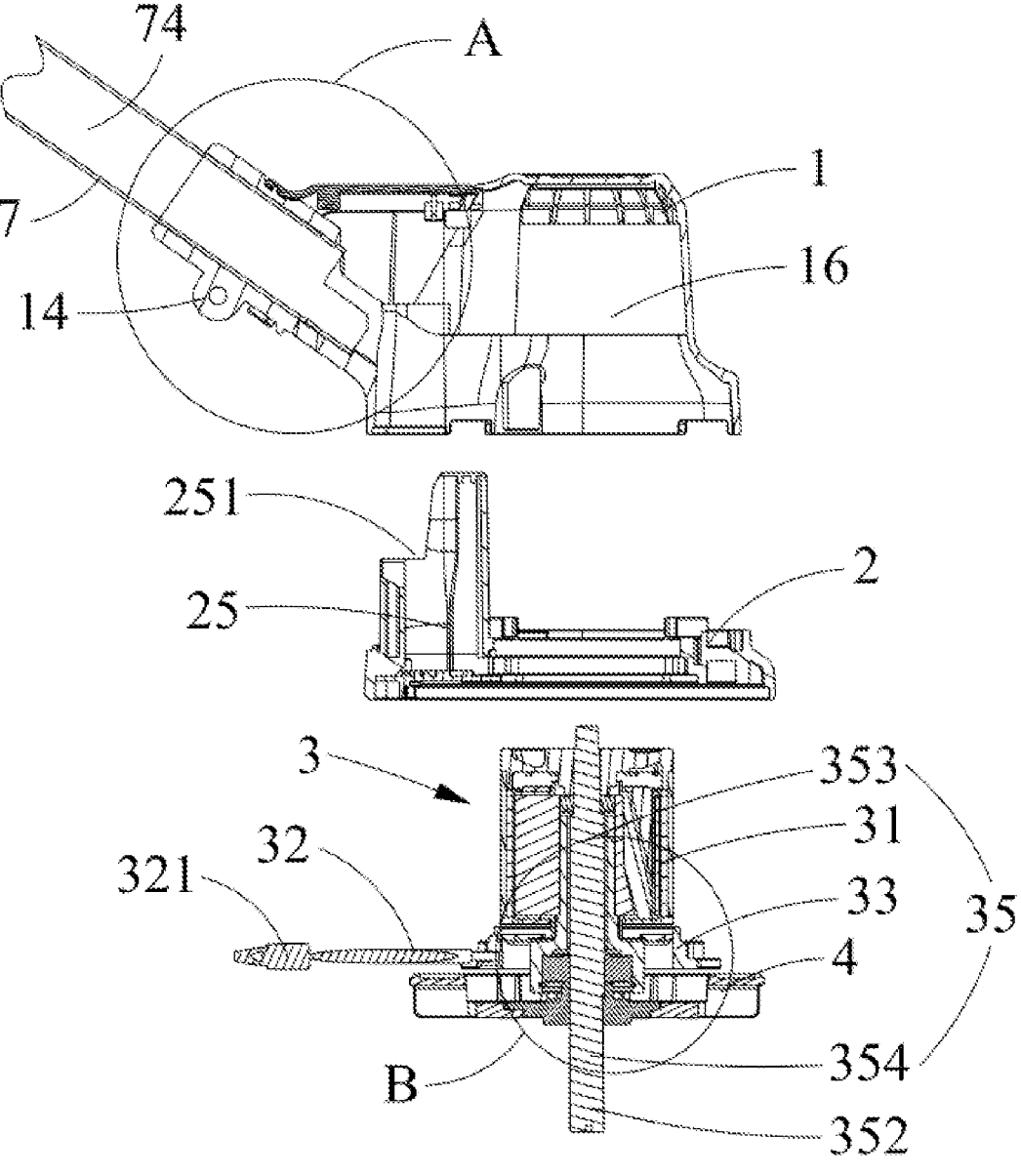
FIG. 3 is an exploded cross-sectional view of the driving assembly of FIG. 2.

Please refer to FIG. 1 through FIG. 3. The disclosure provides a garden tool. The garden tool is a string trimmer 100 or a hedge trimmer, which is used for trimming vegetation. In this embodiment, the string trimmer 100 is taken as an example for description, but it should not be limited to this. Specifically, the string trimmer 100 includes a battery assembly 400, a driving assembly 200, and a connecting assembly 300 that connects the battery assembly 400 and the driving assembly 200. The battery assembly 400 supplies power to the driving assembly 200, which enables the driving assembly 200 to rotate, Wherein, the connecting assembly 300 includes a control part 6, a connecting rod 7 and a passage 74 opened inside the connecting rod 7. Two ends of the connecting rod 7 are respectively connected with the battery assembly 400 and the driving assembly 200. The control part 6 is located in a middle position of the connecting rod 7. An operator controls a mowing speed and movement direction of the string trimmer 100 through the control part 6. The battery assembly 400 includes a power cable (not shown), the driving assembly 200 includes a driving device 3 and a cutting device 5, and the power cable passes through the passage 74 of the connecting rod 7 and is electrically connected with the driving device 3, so that the battery assembly 400 can supply power to the driving device 3 through the power cable, and the driving device 3 drives the cutting device 5 to rotate to cut vegetation on a lawn. In some embodiments, the control part 6 is provided with a start switch and a speed controller. The control part 6, the battery assembly 400 and the driving assembly 200 are all connected through the power cable, so that a start, stop and rotating speed of the driving assembly 200 are controlled through the control part 6.

In this disclosure, a specific structure of the battery assembly 400, a specific structure of the control part 6, a specific structure of the cutting device 5, a connection method between the battery assembly 400 and the connecting rod 7, a connection method between the control part 6 and the connecting rod 7, and a control method of the control part 6 on the driving device 3 may be designed according to a conventional technology, and will not be described again here. The following description will mainly describe in detail a specific structure of the driving assembly 200, a connection structure between the driving device 3 and the battery assembly 400, and a connection method between the connecting rod 7 and the driving assembly 200.

Please refer to FIG. 3. The driving assembly 200 further includes a housing 1, a connecting base 2, a driving device 3 and an air extraction device 4. The connecting base 2 is connected with the housing 1 and the driving device 3 respectively. A housing cavity 16 is arranged in the housing 1 so that part or all of the driving device passes through the connecting base 2 and is housed in the housing cavity 16. The connecting base 2 is arranged between the driving device 3 and the housing 1 to close the housing cavity 16. The air extraction device 4 is located at an end of the driving device 3 away from the housing 1 and is connected with the driving device 3, so that the driving device 3 can drive the air extraction device 4 to rotate to draw out air in the housing cavity 16, which enables the air in the housing cavity 16 to form an airflow and flow through the driving device 3 to dissipate heat from the driving device 3. The cutting device 5 is connected with the driving device 3. The driving device 3 drives the cutting device 5 to rotate to cut vegetation. At the same time, the air extraction device 4 is limited between the cutting device 5 and the driving device 3, thereby achieving a fixation of the air extraction device 4.

Please refer to FIG. 3, FIG. 4 and FIG. 6 through FIG. 8. The string trimmer 100 includes a fixing assembly 500. The connecting assembly 300 and the driving assembly 200 are connected with each other through the fixing assembly 500. Specifically, the connecting rod 7 and the housing 1 are connected with each other through the fixing assembly 500. The connecting rod 7 is provided with a first positioning hole 71 at one end close to the driving assembly 200. The housing 1 is provided with a connecting cavity 11 for housing the connecting rod 7 and a second positioning hole 13 communicated with the connecting cavity 11. The first positioning hole 71 corresponds to the second positioning hole 13. When an external tooling (not shown) is used to pass through the first positioning hole 71 and the second positioning hole 13 in sequence, the connecting assembly 300 is aligned with the driving assembly 200, and the connecting assembly 300 is fixedly connected with the driving assembly 200 through the fixing assembly 500. In some embodiments, the external tooling is a positioning pin, and the first positioning hole 71 and the second positioning hole 13 are both circular holes. The positioning pin passes through the first positioning hole 71 and the second positioning hole 13 and extends into the passage 74 to initially position the connecting rod 7 and the housing 1 in a circumferential direction, then the connecting rod 7 and the housing 1 are fixed through the fixing assembly 500, and the external tooling is take out.

Specifically, the connecting rod 7 is provided with a first fixing hole 72, and the housing 1 is provided with a second fixing hole 12 communicated with the connecting cavity 11 and corresponding to the first fixing hole 72. The fixing assembly 500 passes through the first fixing hole 72 and the second fixing hole 12 to realize a fixed connection between the connecting assembly 300 and the driving assembly 200. In other words, when the external tooling passes through the corresponding first positioning hole 71 and the second positioning hole 13, the first fixing hole 72 and the second fixing hole 12 also correspond to each other. The fixing assembly 500 passes through the first fixing hole 72 and the second fixing hole 12 to fix the connecting assembly 300 and the driving assembly 200 so as to prevent the connecting rod 7 from circumferential rotation relative to the housing 1. In some embodiments, the fixing assembly 500 is a screw. When the positioning pin passes through the first positioning hole 71 and the second positioning hole 13 to achieve a preliminary positioning between the connecting rod 7 and the housing 1, the screw passes through the first fixing hole 72 and the second fixing hole 12 to fix the connecting rod 7 and housing 1.

In this embodiment, an axis along an extension direction of the connecting rod 7 is defined as a central axis of the connecting rod 7, and an axis of the connecting cavity 11 along the extension direction of the connecting rod 7 is defined as a central axis of the connecting cavity 11. When the connecting rod 7 is housed in the connecting cavity 11, the central axis of the connecting rod 7 overlaps with the central axis of the connecting cavity 11, and a relative spatial position of the first fixing hole 72, the central axis of the connecting rod 7 and the first positioning hole 71 are the same that of the second fixing hole 12, the central axis of the connecting cavity 11 and the second positioning hole 13. The connecting rod 7 housed in the connecting cavity 11 is rotated so that the first positioning hole 71 and the second positioning hole 13 correspond to each other and the first fixing hole 72 and the second fixing hole 12 also correspond to each other. In some embodiments, the first positioning hole 71 and the first fixing hole 72 are respectively arranged on two sides of the central axis of the connecting rod 7, and the first positioning hole 71 and the first fixing hole 72 are arranged opposite to each other in a misaligned way.

Figure 4:
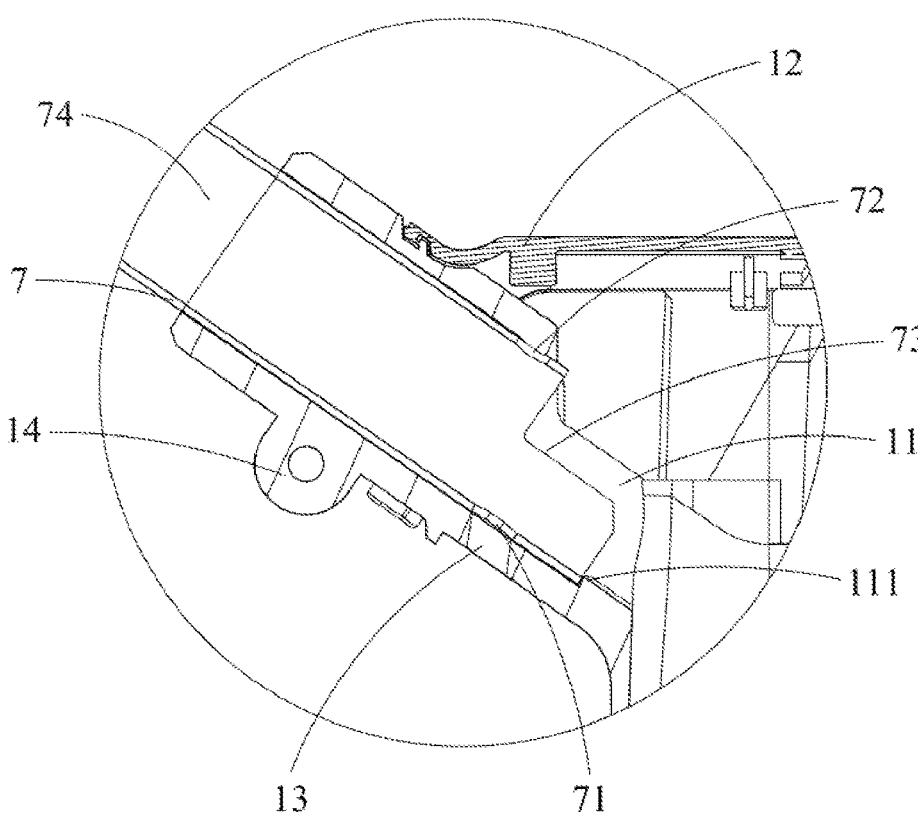
FIG. 4 is an enlarged view of area A in FIG. 3.
Figure 6:
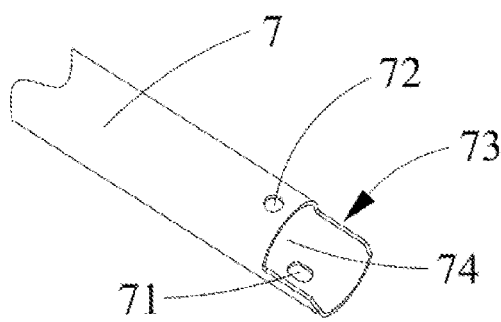
FIG. 6 is a schematic perspective view of a connecting rod in FIG. 3.

Please refer to FIG. 3, FIG. 4 and FIG. 6. The connecting cavity 11 is provided with a protruding block 111 protruding from the housing 1 toward inside of the connecting cavity 11. The connecting rod 7 extends into the connecting cavity 11 so that an end of the connecting rod 7 abuts the protruding block 111. Specifically, a cutting plane of the cutting device 5 is defined as a horizontal plane. An opening direction of the connecting cavity 11 and a mounting direction of the connecting rod 7 are inclined relative to the horizontal plane. The protruding block 111 is arranged at one end of the connecting cavity 11 close to the horizontal plane. One end of the connecting rod 7 extending into the connecting cavity 11 includes a first part and a second part. The first part and the second part are surrounded to form an opening 73. When the connecting rod 7 extends into the connecting cavity 11, an edge of the first part abuts the protruding block 111 to limit a length of the connecting rod 7 extending into the connecting cavity 11. The first positioning hole 71 is opened in the first part, and the first fixing hole 72 is opened in the second part. The first positioning hole 71 and the first fixing hole 72 are respectively arranged on two sides of the central axis of the connecting rod 7 to facilitate the operator to mount the connecting rod 7 and the housing 1.

The connecting cavity 11 is communicated with the housing cavity 16 of the housing 1, so that when the driving device 3 drives the air extraction device 4 to rotate, the air can flow into the connecting cavity 11 from the passage 74 of the connecting rod 7 through the opening 73, and then enter the housing cavity 16 to dissipate heat from the driving device 3. A design of the opening 73 allows the air in the passage 74 to quickly enter the connecting cavity 11 and flow to the driving device 3 evenly, so as to dissipate heat evenly from the driving device 3.

Figure 8:
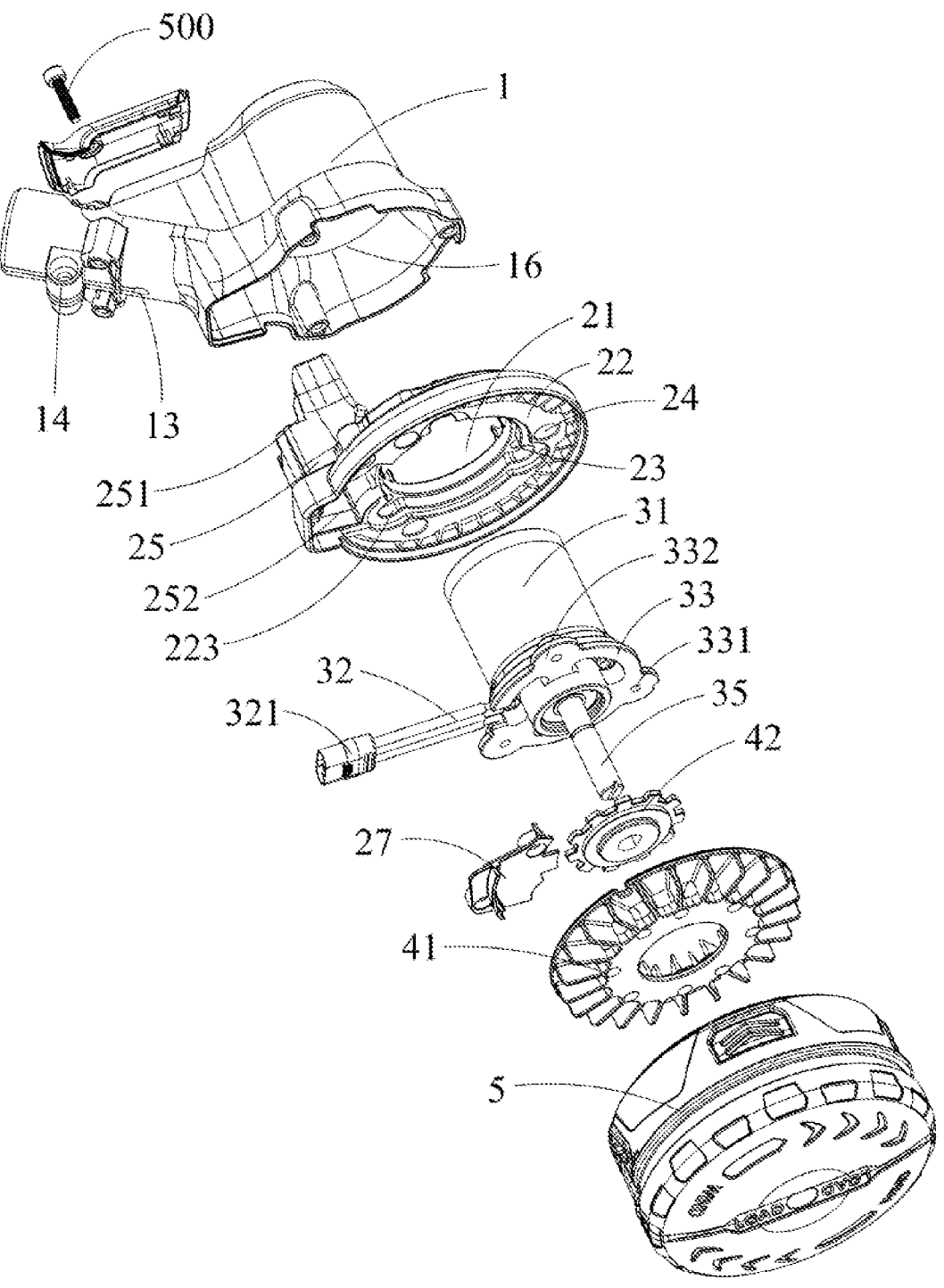
FIG. 8 is an exploded view of the driving assembly in FIG. 7 from another angle.
Figure 9:
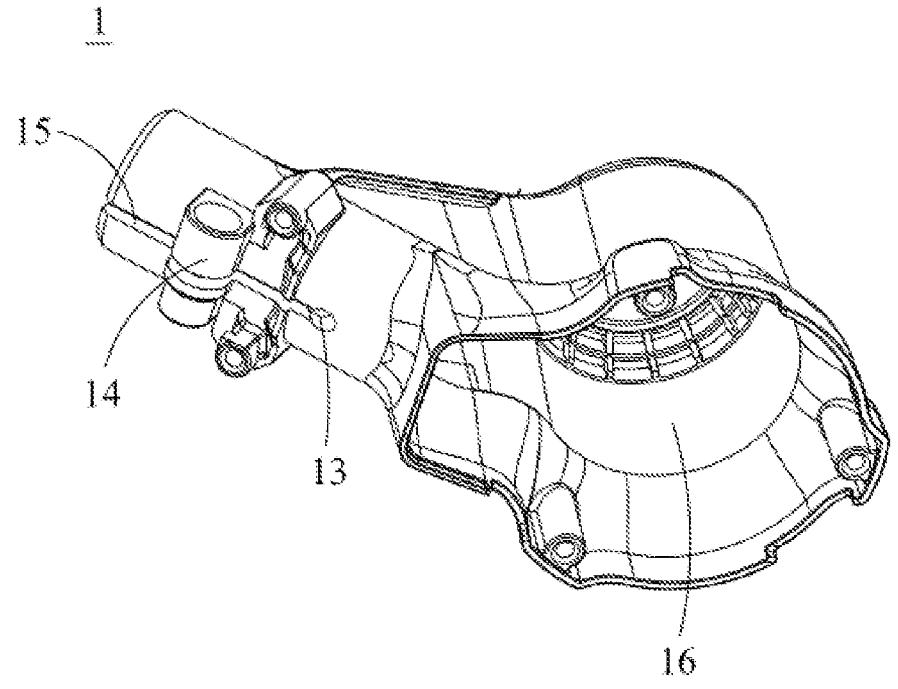
FIG. 9 is a schematic perspective view of a housing in FIG. 8.

Please refer to FIG. 3 combined with FIG. 8 and FIG. 9. The driving assembly 200 includes a locking component (not shown). The housing 1 is provided with a fastening groove 15 and a fastening part 14. Wherein, the fastening groove 15 is communicated with the connecting cavity 11, and there are two the fastening parts 14 arranged on two sides of the fastening groove 15. The locking component is respectively connected with the two fastening parts 14 to reduce a size of the fastening groove 15. Specifically, the fastening part 14 protrudes outward from the housing 1, and the fastening groove 15 penetrates the housing 1 to communicate with the connecting cavity 11. The fastening groove 15 extends inward from a side of the housing 1 close to the connecting rod 7 and is communicated with the second positioning hole 13, which means that the fastening groove 15 is arranged in a long strip shape. When the connecting rod 7 is housed in the connecting cavity 11, the first part abuts the protruding block 111 to limit a length of the connecting rod 7 extending into the connecting cavity 11, and then external tooling extends into the first positioning hole 71 and the second positioning hole 13 to achieve the preliminary positioning between the connecting rod 7 and the housing 1. And then the fixing assembly 500 passes through the first fixing hole 72 and the second fixing hole 12 to realize a circumferential positioning between the connecting rod 7 and the housing 1 to prevent the connecting rod 7 from rotating relative to the housing 1. Finally, the locking component passes through the two fastening parts 14 to drive the locking component, so as to reduce a distance of the fastening groove 15, so that the connecting rod 7 is in contact with an inner wall of the connecting cavity 11 and the housing 1 locks the connecting rod 7, which further improves a stability of the connection between the housing 1 and the connecting rod 7.

Figure 5:
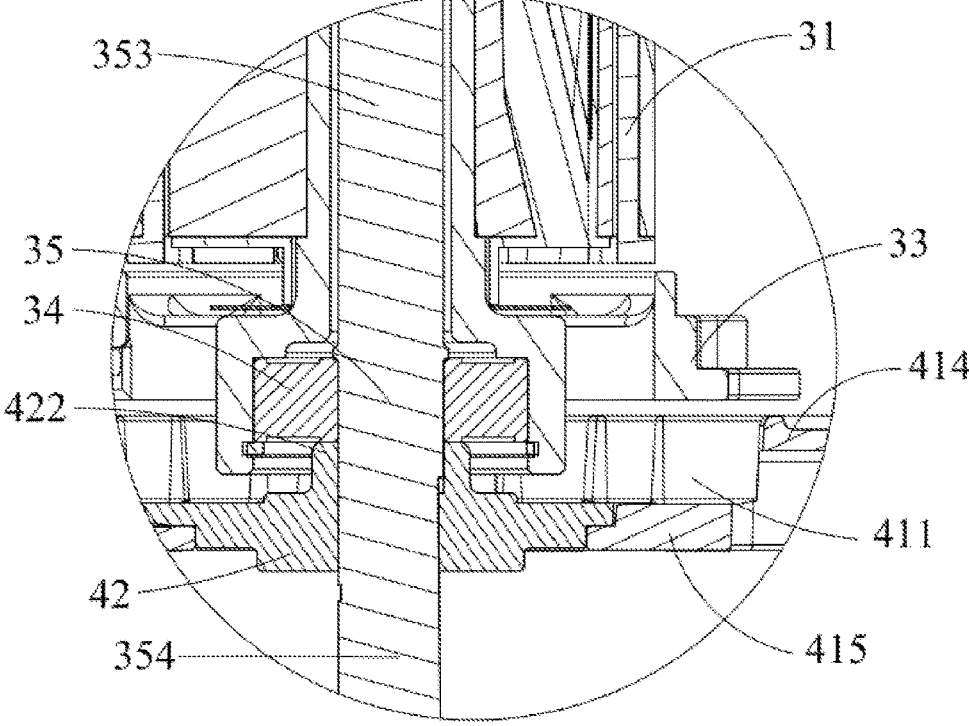
FIG. 5 is an enlarged view of area B in FIG. 3.
Figure 7:
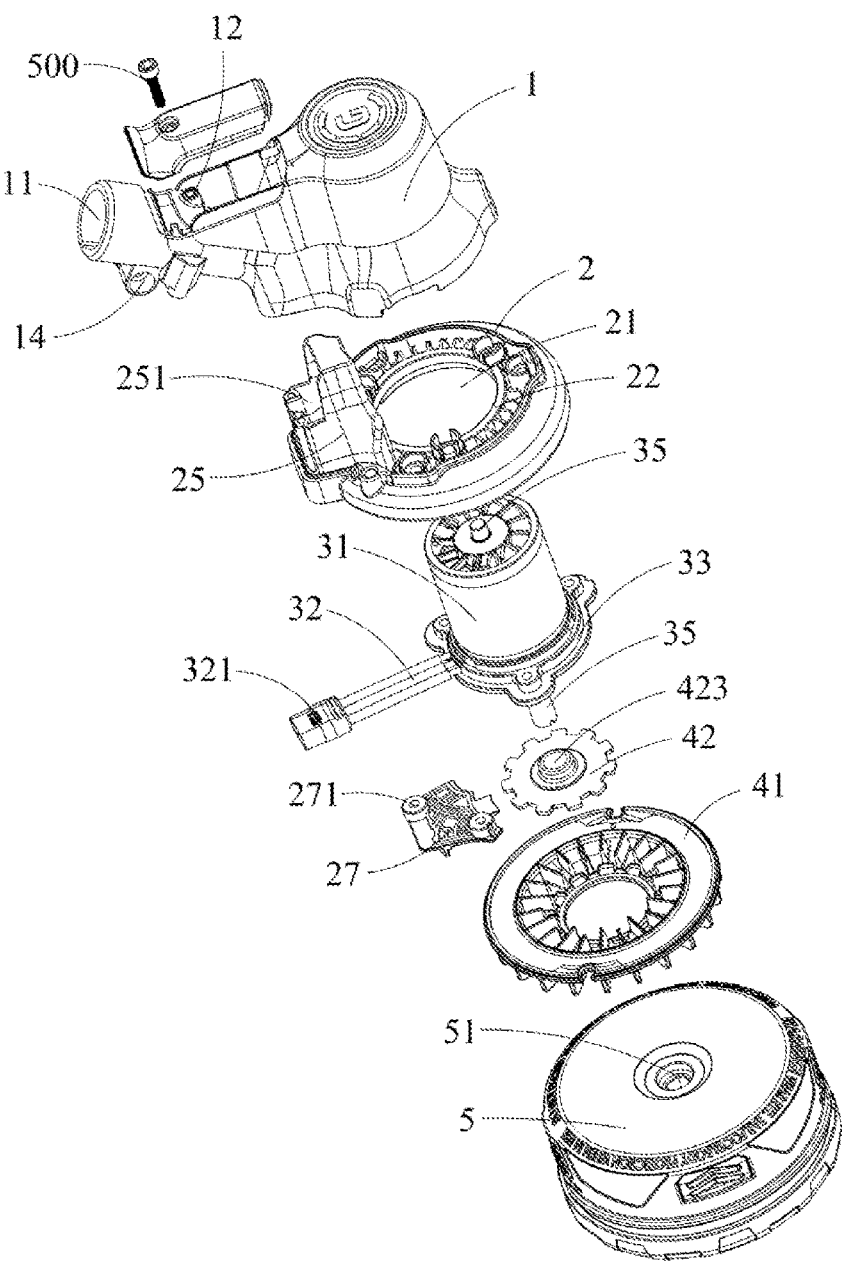
FIG. 7 is an exploded view of the driving assembly of FIG. 2.

Please refer to FIG. 3, FIG. 5 combined with FIG. 7 and FIG. 8. The driving device 3 includes a driving body 31, a mounting part 33 and an output shaft 35. The output shaft 35 includes an input section 353 and an output section 354 that are connected with each other. Wherein, the input section 353 is housed in the driving body 31, and the output section 354 extends outward from the driving body 31, so that the driving body 31 can input driving force in the input section 353 and transmit the force to the output section 354, which realizes that the driving body 31 drives the output shaft 35 to rotate for outward power output. The mounting part 33 is arranged on a side of the driving body 31 close to the output section 354. A receiving hole 21 is arranged on the connecting base 2. A side of the driving body 31 away from the output section 354 passes through the receiving hole 21 so that a bottom of the connecting base 2 is connected with the mounting part 33. Specifically, the air extraction device 4 is connected with the output section 354 so that the driving body 31 can drive the output shaft 35 to rotate and drive the air extraction device 4 to rotate, so as to drive air around the driving body 31 and reduce a temperature of the driving body 31. In some embodiments, the air extraction device 4 and the output shaft 35 rotate synchronously, and the driving body 31 is a motor.

The connecting base 2 includes a connecting part 22. The receiving hole 21 is located in a center position of the connecting part 22 and penetrates the connecting part 22. A shape and size of the driving body 31 are the same as a shape and size of the receiving hole 21, so that the driving body 31 can be housed in the receiving hole 21, and an outer side wall of the driving body 31 is in contact with an inner side wall of the receiving hole 21, which improves a connection strength between the driving body 31 and the connecting base 2. A size of the mounting part 33 is larger than the size of the driving body 31, so that when the driving body 31 passes through the receiving hole 21, the mounting part 33 can be fixedly connected with the connecting part 22 to limit a position of the driving body 31 relative to the connecting base 2. With this arrangement, the driving body 31 is directly connected with the air extraction device 4 through the output section 354, which eliminates a thickness of the connecting base 2 between the driving body 31 and the air extraction device 4, reduces a distance between the air extraction device 4 and the driving body 31, and improves air extraction efficiency of the air extraction device 4 and a heat dissipation effect of a whole machine.

Figure 10:
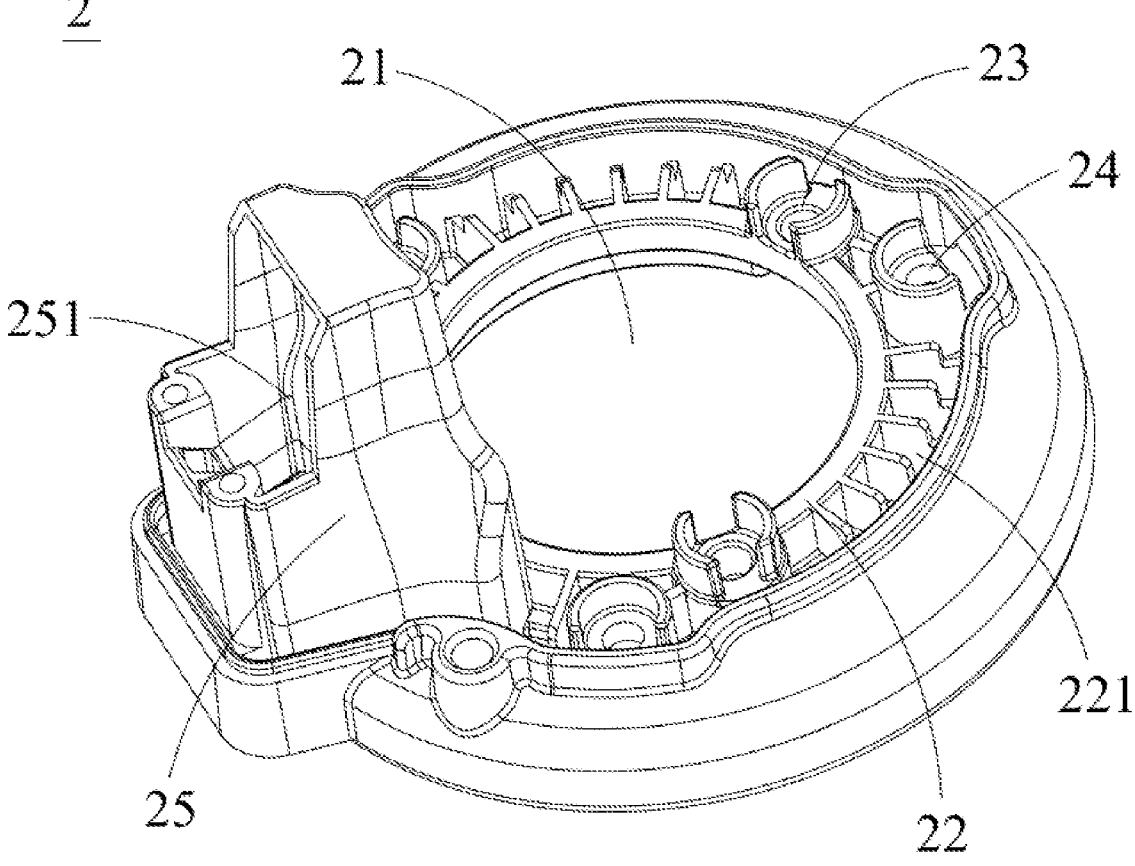
FIG. 10 is a schematic perspective view of a connecting base in FIG. 7.
Figure 12:
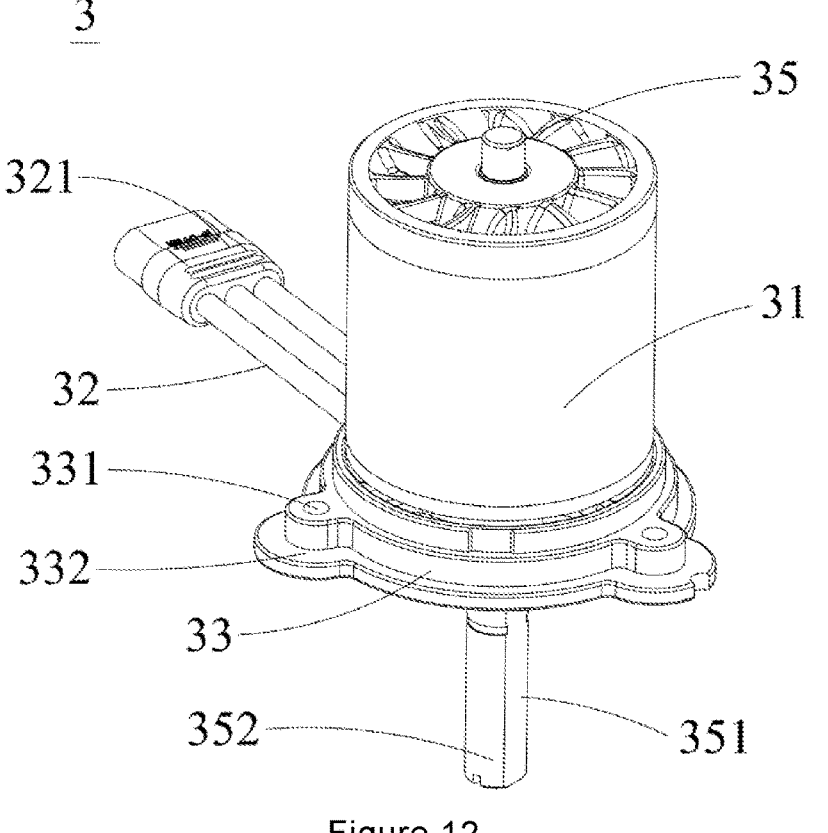
FIG. 12 is a schematic perspective view of the driving device in FIG. 7.
Figure 13:
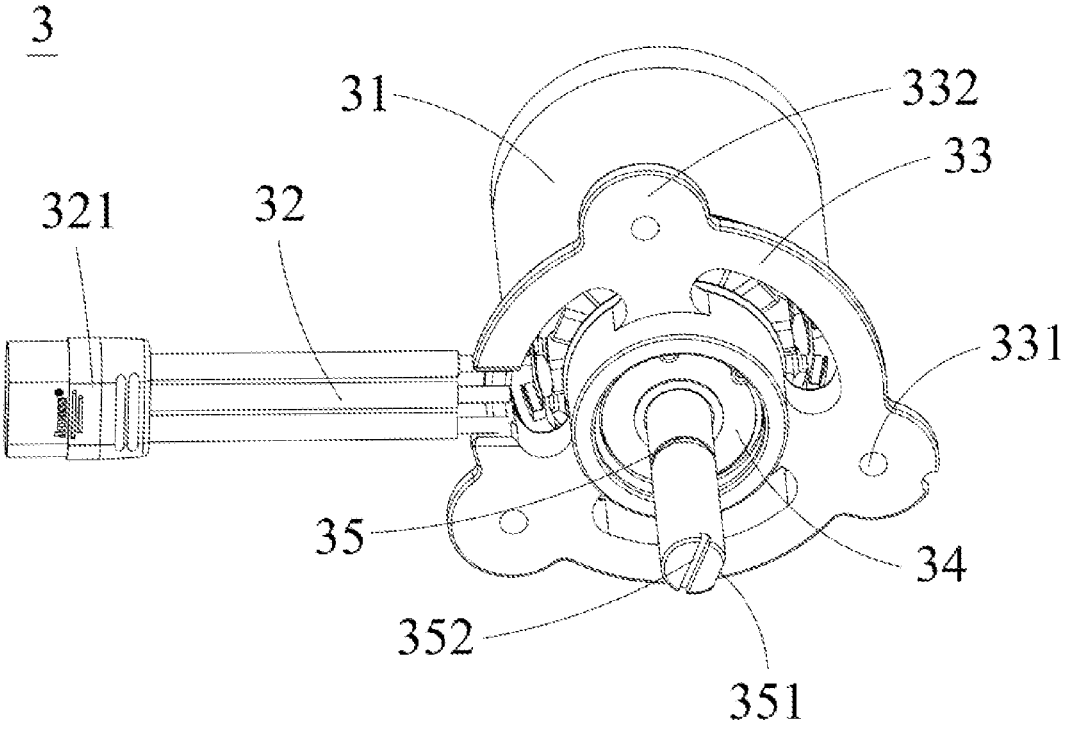
FIG. 13 is an exploded view of the driving device in FIG. 12 from another angle.

Please refer to FIG. 10, FIG. 12 and FIG. 13 combined with FIG. 8. The driving assembly 200 includes the locking component. The connecting part 22 is provided with a first through hole 23 and the mounting part 33 is provided with a mounting hole 331. The locking component passes through the first through hole 23 and the mounting hole 331 to connect the driving device 3 and connecting base 2. The mounting portion 33 includes a mounting protrusion 332. A bottom of the connecting part 22 is concave inward to form a clamping groove 223 corresponding to the mounting protrusion 332. At least part of the mounting protrusion 332 is housed in the clamping groove 223.

Specifically, a protruding direction of the mounting protrusion 332 is to extend from the driving body 31 in a direction away from the driving body 31, and the mounting hole 331 is arranged on the mounting protrusion 332 and penetrates the mounting protrusion 332. A shape and size of the clamping groove 223 corresponds to the mounting protrusion 332, and the clamping groove 223 does not penetrate the connecting part 22, so that when the mounting portion 33 abuts the connecting part 22, at least part of the mounting protrusion 332 is housed in the clamping groove 223 and enables an upper surface of the mounting protrusion 332 to abut the connecting part 22. Wherein, the first through hole 23 is arranged inside the clamping groove 223 and penetrates the connecting part 22. When the mounting protrusion 332 is housed in the clamping groove 223, the first through hole 23 corresponds to the mounting hole 331, so that the locking component may pass through the first through hole and the mounting hole 331 to realize a connection between the mounting part 33 and the connecting part 22.

In this embodiment, three mounting protrusions 332 are arranged evenly on the mounting portion 33, three mounting holes 331 are arranged corresponding to the mounting protrusions 332, and both the clamping groove 223 and the first through hole 23 are provided with three corresponding the mounting protrusions 332. When the driving device 3 is housed in the receiving hole 21 and the mounting part 33 abuts the connecting part 22, the driving device 3 is rotated, so that the mounting protrusions 332 can be housed in the clamping groove 223, which means that the mounting hole 331 corresponds to the first through hole 23, and the driving device 3 and the connecting base 2 are fixed through the locking component. Of course, in other embodiments, multiple mounting holes 331 may be arranged on the mounting part 33, which is not limited here.

The connecting base 2 is further provided with a second through hole 24. After the driving body 31 is fixedly connected with the connecting base 2, the connecting base 2 abuts the housing 1, and the locking component passes through the second through hole 24 and is connected with the housing 1 to house part of the driving body 31 in the housing cavity 16. The driving body 31 is housed through the connecting base 2 and the driving body 31. Specifically, the mounting part 33 is mounted on a side of the connecting part 22 away from the housing 1, which means that the driving body 31 passes through the receiving hole 21 from a side of the connecting part 22 away from the housing 1 and is placed in the housing cavity 16. The air extraction device 4 is sleeved on the output section 354 and abuts the connecting base 2 to reduce a distance between the air extraction device 4 and the driving body 31.

The connecting part 22 is provided with a plurality of air outlet holes 221. The plurality of air outlet holes 221 is evenly arranged around the receiving hole 21 and all penetrate the connecting part 22. When the driving device 3 drives the air extraction device 4 to rotate, the air in the housing cavity 16 passes through the air outlet holes 221 and the air extraction device 4 and is blown outward to cool down the driving device 3.

Figure 14:
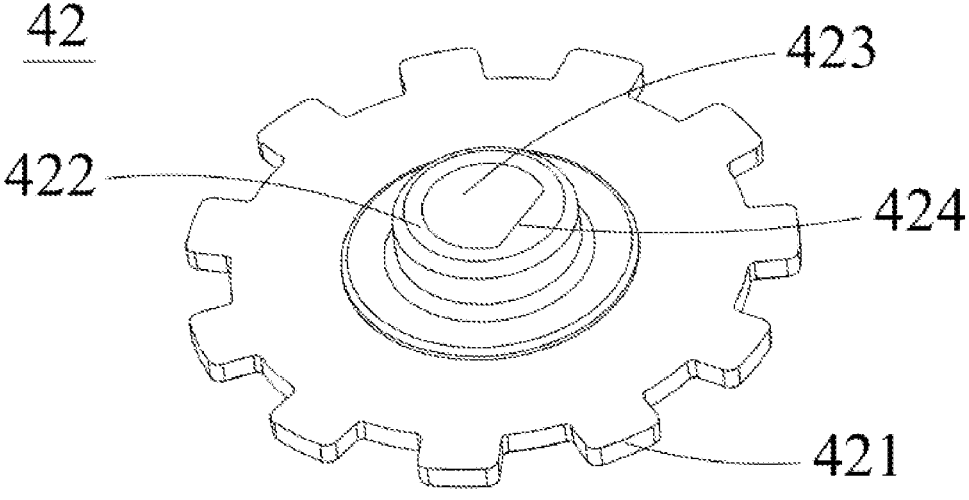
FIG. 14 is a schematic perspective view of a transmission assembly in FIG. 7.

Please refer to FIG. 3, FIG. 5 and FIG. 14. The driving device 3 further includes a bearing 34 arranged between the mounting part 33 and the output shaft 35. Part of the mounting part 33 is sleeved on an outside of the driving body 31, and the other part of the mounting part 33 is sleeved on an outside of the output shaft 35 through the bearing 34, so that the output shaft 35 can rotate relative to the mounting part 33. A side of the air extraction device 4 close to the driving body 31 is provided with an abutting end 422 extending a direction toward of the driving body 31. The abutting end 422 abuts part of the bearing 34, so that the abutting end 422 can rotate together with the bearing 34 driven by the output shaft 35 to drive the air in the housing cavity 16 to flow. Of course, in other embodiments, the mounting part 33 may be directly fixedly connected with the driving body 31. In this case, the bearing 34 is arranged between the output shaft 35 and the driving body 31, so that the output shaft 35 can rotate relative to the driving body 31 to further reduce a distance between the air extraction device 4 and the driving body 31, which is not limited herein.

Figure 15:
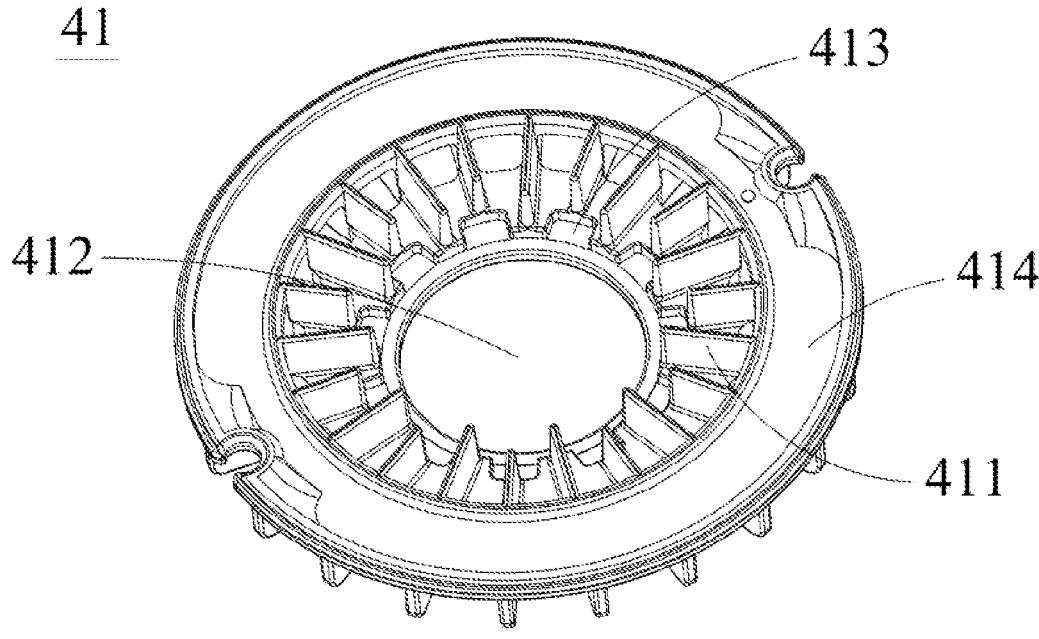
FIG. 15 is a schematic perspective view of a fan blade in FIG. 7.

Please refer to FIG. 15, the air extraction device 4 includes a fan blade 41 and a transmission component 42 connected with the fan blade 41. The fan blade 41 is provided with a clamping hole 412, and the transmission component 42 is provided with a gear part 421. The transmission component 42 is housed in the clamping hole 412 and is connected with the fan blade 41 through the gear part 421. Specifically, the gear part 421 is located around an edge of the transmission component 42, and a side wall edge of the clamping hole 412 is provided with a toothed part 413 corresponding to the gear part 421. When the transmission component 42 is housed in the clamping hole 412, the gear part 421 meshes with the toothed part 413, so that the transmission component 42 and the fan blade 41 can rotate synchronously with a matching of the gear part 421 and the toothed part 413.

A side of the transmission component 42 close to the driving device 3 is provided with the abutting end 422 protruding toward the driving device 3 for abutting the bearing 34, so as to maintain a certain distance between the fan blades 41 and the mounting part 33, which avoids a contact between the fan blades 41 and the mounting part 33 and reduces wear. In some embodiments, a distance between the fan blades 41 and the mounting part 33, in an extension direction of the output shaft 35, is 2 mm. Of course, in other embodiments, a protruding length of the abutting end 422 may be adjusted according to actual situation to adjust the distance between the fan blades 41 and the mounting part 33, which is not limited here.

Figure 16:
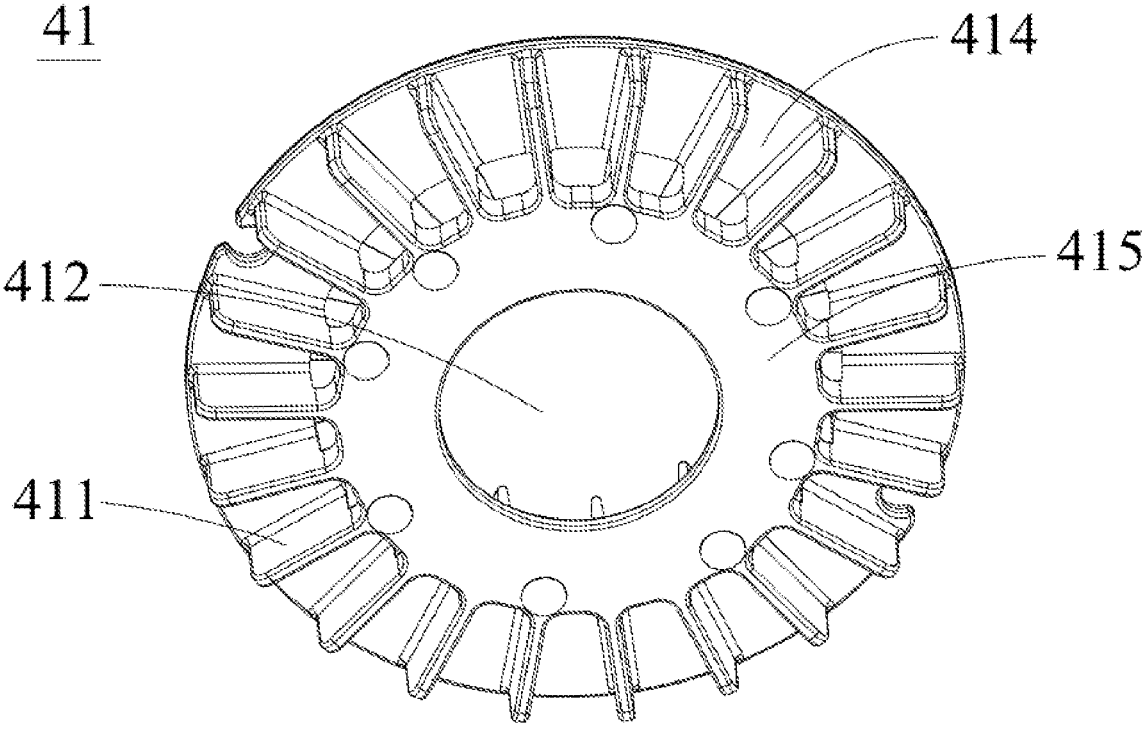
FIG. 16 is a schematic perspective view of the fan blade in FIG. 15 from another angle.

Please refer to FIG. 7, FIG. 15 and FIG. 16. The fan blade 41 includes a supporting plate 414, a bottom plate 415 and several blade pieces 411. The several blade pieces 411 are radially distributed with the clamping hole 412 as a center. The supporting plate 414 and the bottom plate 415 are respectively arranged on both sides of the blade 411 and are arranged in a misaligned way. Specifically, the supporting plate 414 is arranged on a side of the fan blade 41 close to the driving device 3 and connected with several blade pieces 411. The bottom plate 415 is arranged on a side of the fan blade 41 away from the driving device 3 and is connected with several blade pieces 411.

Specifically, the blade piece 411 is divided into two parts, one part is arranged close to the clamping hole 412, and the other part is arranged away from the clamping hole 412. The bottom plate 415 is connected with the part close to the clamping hole 412 and is located on a side of the blade piece 411 away from the driving device 3. The supporting plate 414 is connected with the part away from the clamping hole 412 and is located on a side of the blade piece 411 close to the driving device 3, so that when the fan blade 41 rotates, air in a part of the air extraction device 4 close to the clamping hole 412 flows in a direction away from the clamping hole 412 under an action of two adjacent blade pieces 411 and the bottom plate 415, and is blown outward under an action of two adjacent blades 411 and the supporting plate 414.

Please refer to FIG. 7, FIG. 12 through FIG. 14. A transmission hole 423 and a transmission surface 424 located in the transmission hole 423 are arranged at a center of the transmission component 42. The output shaft 35 is provided with an anti-slip surface 351. A shape and size of the output shaft 35 are matched with a shape and size of the transmission hole 423, so that the output shaft 35 is housed in the transmission hole 423 and the transmission surface 424 is fitted with the anti-slip surface 351. This arrangement allows the air extraction device 4 to rotate synchronously with the output shaft 35.

The output section 354 is provided with a first fixing end 352 at one end away from the driving body 31. The driving assembly 200 includes the cutting device 5, a second fixing end and a shaft hole 51 located in the cutting device 5. The output section 354 passes through the shaft hole 51 and connects the first fixing end 352 with the second fixing end to limit the air extraction device 4 between the driving device 3 and the cutting device 5. Specifically, a shape and size of the shaft hole 51 match the shape and size of the output section 354, and the first fixing end 352 and the second fixing end are connected through threads, so that a distance between the cutting device 5 and the driving body 31 can be changed. Through a mutual matching between the first fixing end 352 and the second fixing end, the air extraction device 4 is limited between the driving body 31 and the cutting device 5, and the output shaft 35 and the cutting device 5 may rotate synchronously.

In this embodiment, the first fixing end 352 is connected with the second fixing end to limit the air extraction device 4 between the mounting part 33 and the cutting device 5, and to enable a side of the cutting device 5 close to the driving device to abut the bottom plate 415 of the air extraction device 4. The distance between the cutting device 5 and the driving body 31 is reduced through a rotation of the first fixing end 352 and the second fixing end, until the abutting end 422 of the air extraction device 4 abuts the bearing 34 of the driving device 3, the distance between the fan blades 41 and the driving body 31 are maintained while the air extraction device 4 and the cutting device 5 rotate synchronously. Of course, in other embodiments, the air extraction device 4 may also be fixed or limitedly connected with the output section 354 to maintain the distance between the fan blades 41 and the driving body 31, which is not limited here.

Figure 11:
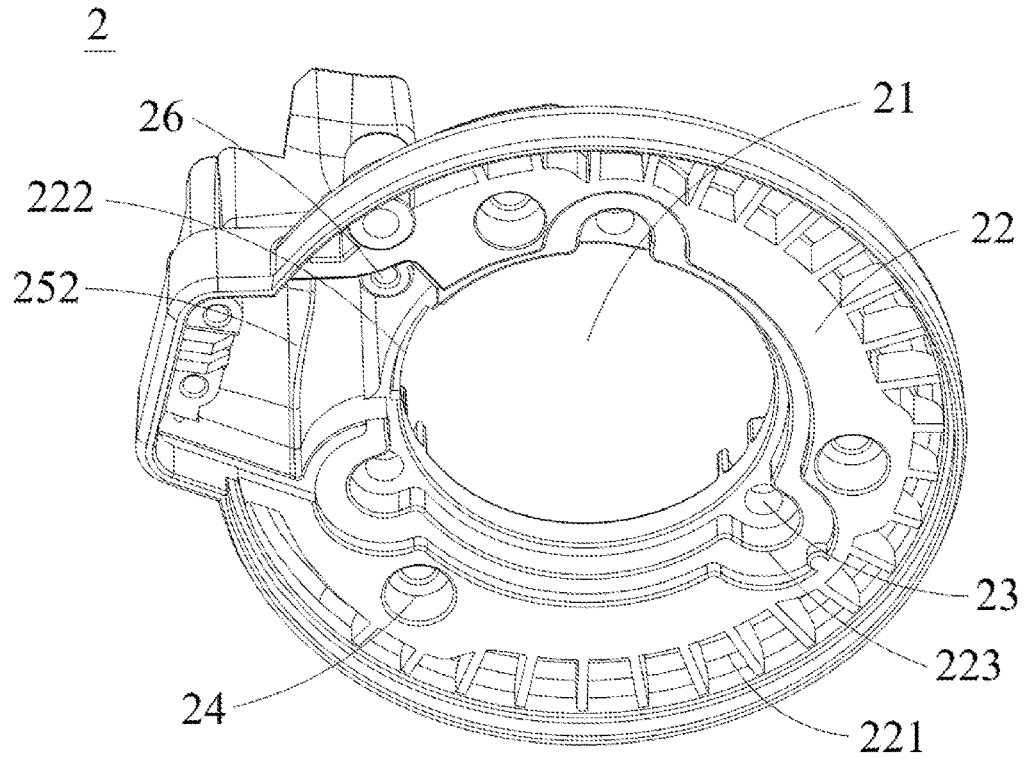
FIG. 11 is a schematic perspective view of the connecting base in FIG. 10 from another angle.

Please refer to FIG. 8, FIG. 10 and FIG. 11. The driving device 3 includes a connecting wire 32 with one end connected with the driving body 31 and the other end detachably electrically connected with the power cable of the battery assembly 400, so that the battery assembly 400 can supply power to the driving device 3 through the power cable and the connecting wire 32. The connecting base 2 is provided with an accommodating part 25 and an accommodating cavity 252 formed in the accommodating part 25. At least part of the connecting wire 32 and at least part of the power cable are accommodated in the accommodating cavity 252. On the one hand, the connecting wire 32 and the power cable may be conveniently connected and separated, and on the other hand, excess cables may be stored to avoid exposures of the cables. Of course, in other embodiments, the connecting wire 32 of the driving device 3 may also be electrically connected with other external power sources, which is not limited here.

Specifically, a side of the connecting base 2 close to the air extraction device 4 is defined as a bottom of the connecting base 2. The bottom of the connecting base 2 is depressed inward to form the accommodating cavity 252, and the accommodating cavity 252 is located beside the accommodating hole 21 and corresponds to the accommodating cavity 11. The accommodating part 25 is also provided with a through hole 251 communicated to the accommodating cavity 252. The through hole 251 is arranged on a side of the accommodating part 25 close to the housing 1 and connects the accommodating cavity 252 with the housing cavity 16. The power cable passes through the passage 74 of the connecting rod 7, the connecting cavity 11, the housing cavity 16, the through hole 251 and the accommodating cavity 252 in sequence from the battery assembly 400 and is electrically connected with the connecting wire 32 and the excess cable after connection is housed in the accommodating cavity 252, so as to supply power to the driving body 31.

An end of the connecting wire 32 away from the driving device 3 is provided with a connecting terminal 321, and the power cable is provided with a power terminal (not shown). The power terminal passes through the through hole 251 and is plugged into the connecting terminal 321 and is housed in the accommodation cavity 252. The connecting terminal 321 and the power terminal are configured to be plugged in, so as to realize a convenient connection between the connecting wire 32 and the power cable and facilitate a replacement of the driving body 31. In this embodiment, the connecting terminal 321 is a male terminal and the power terminal is a female terminal to realize an insertion between the connecting terminal 321 and the power terminal. Of course, in other embodiments, the connecting terminal 321 may be a female terminal and the power terminal is a male terminal, and the connecting terminal 321 and the power terminal may also be detachably connected through other structures, which is not limited here.

The connecting base 2 includes the connecting part 22 and a blocking plate 27 matching the accommodating part 25. The blocking plate 27 is connected with the accommodating part 25 to cover the power cable and the connecting wire 32 housed in the accommodating cavity 252. Specifically, the accommodating part 25 is provided with a third through hole 26, and a fourth through hole 271 corresponding to the third through hole 26 is arranged on the blocking plate 27. The locking component passes through the third through hole 26 and the fourth through hole 271 to connect the blocking plate 27 and the accommodating part 25, so as to cover the accommodating cavity 252.

The connecting part 22 is further provided with a wire groove 222 connected with the accommodation cavity 252. The connecting wire 32 is placed between the connecting part 22 and the blocking plate 27 and is housed in the wire groove 222 to prevent the connecting wire 32 from being squeezed when the blocking plate 27 and the connecting part 22 are assembled, thereby prolonging a duration life of the connecting wire 32.

Specifically, when the driving body 31 is damaged and needs to be repaired or replaced, the mounting part 33 is disassembled to separate the driving body 31 from the connecting base 2, the blocking plate 27 is disassembled, and the connecting terminal 321 and the power terminal are disassembled so that the driving body 31 can be completely separated from the driving assembly 200. When mounting, an assembly tool is used to assemble the mounting part 33 and the connecting base 2, the connecting terminal 321 is electrically connected with the power terminal, then the excess connecting wires 32 and power cables are stored in the accommodation cavity 252, and the blocking plate 27 is mounted to cover the accommodation cavity 252, so that an assembly of the driving device 3 is completed.

In this embodiment, the driving assembly 200 is used in the string trimmer 100. At this time, the cutting device 5 is a string trimmer head. The cutting device 5 is driven to rotate through the driving device 3 to achieve external work. On the one hand, the distance between the fan blades 41 and the driving body 31 is reduced, which enables a heat dissipation effect of the driving body 31 to be better. On the other hand, a detachable electrical connection between the power cable and the connecting wire 32 facilitates a replacement or maintenance of the driving body 31. Of course, in other embodiments, the driving assembly 200 may also be used in a hedge trimmer. In this case, the cutting device 5 is a blade arranged at a front end of the hedge trimmer. The driving device 3 drives the blade to move forward and backward, so that the vegetation is cut, and a connection method of the cutting device 5 on the hedge trimmer is the same as that on the string trimmer, which will not be described again here.

In summary, the string trimmer 100 of the disclosure is provided with the first positioning hole 71 on the connecting rod 7 and the second positioning hole 13 on the housing 1, and the external tooling is used to pass through the first positioning hole 71 and the second positioning hole 13, which realizes the preliminary positioning between the connecting rod 7 and the housing 1. At this time, the housing 1 and the connecting rod 7 are assembled through the fixing assembly 500, which avoids the fixing assembly 500 from damaging the housing 1 and the connecting rod 7, and improves a yield rate of the product. And at the same time, an assembly efficiency of the connecting rod 7 and the housing 1 is improved. Through arranging the receiving hole 21 on the connecting base 2 that matches the driving body 31, the side of the driving body 31 away from the output section 354 passes through the receiving hole 21 and enables the driving body 31 to be housed in the receiving hole 21, so that there is no blocking of the connecting the base 2 between the air extraction device 4 and the driving body 31, reducing the distance between the air extraction device 4 and the driving body 31, and improving the heat dissipation effect of the air extraction device 4 on the driving body 31 and an overall power and performance of the driving assembly 200. Through arranging the connecting wire 32 on the driving device 3 and detachably connecting the driving device 3 to the external power cable through the connecting wire 32, the driving device 3 may be conveniently disassembled and replaced. Through arranging the accommodating cavity 252 for accommodating the connecting wire 32 and the power cable on the connecting base 2 to store excess cables and avoid damage caused by exposed cables. Through arranging the blocking plate 27 corresponding to the accommodating cavity 252, a sealing of the accommodation cavity 252 is realized. A bearing 34 is arranged between the mounting part 33 and the output shaft 35, so that the output shaft 35 can rotate relative to the mounting part 33. Through arranging the supporting plate 414 and the bottom plate 415 on two sides of the blade 411 respectively in the misaligned way, the air in the driving device 3 may be discharged outward and the heat dissipation of the driving body 31 can be achieved.

The above embodiments are only used to illustrate the technical solutions of the disclosure and are not limiting. Although the disclosure has been described in detail with reference to the embodiments, those of ordinary skill in the art should understand that the technical solutions of the disclosure may be modified or equivalent substituted without departing from a scope of the technical solution of the disclosure.

What is claimed is:

1. A driving assembly, comprising:
a connecting base, comprising a connecting part, and
a driving device, comprising a driving body, a mounting part and an output shaft, wherein
the output shaft comprises an input section and an output section, the input section is housed in the driving body and extends outward from the driving body to form the output section, the mounting part is arranged on a side of the driving body close to the output section, a receiving hole is arranged on the connecting base, and a side of the driving body away from the output section passes through the receiving hole and connects a bottom of the connecting base with the mounting part;
the mounting part comprises a mounting protrusion, a bottom of the connecting part is concave inward to form a clamping groove corresponding to the mounting protrusion, and at least part of the mounting protrusion is housed in the clamping groove.

2. The driving assembly according to claim 1, wherein
the receiving hole is arranged at a center position of the connecting part, and the mounting part is fixedly connected with the connecting part.

3. The driving assembly according to claim 2, wherein
the driving assembly comprises a locking component, the connecting part is provided with a first through hole, the mounting part is correspondingly provided with a mounting hole, and the locking component passes through the first through hole and the mounting hole to connect the driving device and the connecting base.

4. The driving assembly according to claim 1, wherein
the driving assembly comprises an air extraction device connected with the output section, and when the driving body drives the output shaft, the air extraction device rotates synchronously with the output shaft.

5. The driving assembly according to claim 4, wherein
the driving device comprises a bearing arranged between the mounting part and the output shaft, a side of the air extraction device close to the driving body is provided with an abutting end extending along a direction toward the driving body, and the abutting end is in contact with the bearing.

6. The driving assembly according to claim 4, wherein
the air extraction device comprises a fan blade, and a distance between the fan blade and the mounting part in an extension direction of the output shaft is 2 mm.

7. The driving assembly according to claim 4, wherein
the output shaft is provided with an anti-slip surface, the air extraction device comprises a transmission hole coupled with the output shaft, a transmission surface is provided in the transmission hole, the output shaft is housed in the transmission hole and the anti-slip surface is fitted with the transmission surface to enable the output shaft and the air extraction device to rotate synchronously.

8. The driving assembly according to claim 4, wherein
an end of the output section away from the driving body is provided with a first fixing end, the driving assembly further comprises a cutting device, the cutting device is provided with a second fixing end and a shaft hole, the output shaft passes through the shaft hole and connects the first fixing end with the second fixing end to limit the air extraction device between the driving device and the cutting device.

9. A garden tool, comprising:
a battery assembly,
a connecting assembly, and
a driving assembly, wherein
the connecting assembly connects the battery assembly and the driving assembly, the battery assembly is configured to supply power to the driving assembly, the driving assembly comprises a connecting base and a driving device, the connecting base comprises a connecting part, the driving device comprises a driving body, a mounting part and an output shaft, the output shaft comprises an input section and an output section, the input section is housed in the driving body and extends outward from the driving body to form the output section, the mounting part is arranged on a side of the driving body close to the output section, a receiving hole is arranged on the connecting base, and a side of the driving body away from the output section passes through the receiving hole and connects a bottom of the connecting base with the mounting part, the mounting part comprises a mounting protrusion, a bottom of the connecting part is concave inward to form a clamping groove corresponding to the mounting protrusion, and at least part of the mounting protrusion is housed in the clamping groove.

10. The garden tool according to claim 9, wherein
the connecting base comprises a connecting part, the receiving hole is arranged at a center position of the connecting part, and the mounting part is fixedly connected with the connecting part.

11. The garden tool according to claim 9, wherein
the driving assembly comprises an air extraction device connected with the output section, and when the driving body drives the output shaft, the air extraction device rotates synchronously with the output shaft.

12. The garden tool according to claim 11, wherein
the driving device comprises a bearing arranged between the mounting part and the output shaft, a side of the air extraction device close to the driving body is provided with an abutting end extending along a direction toward the driving body, and the abutting end is in contact with the bearing.

13. The garden tool according to claim 9, wherein
the garden tool is a string trimmer or a hedge trimmer.

\* \* \* \* \*